March 22, 1932. R. KÖLLIKER 1,850,723
MIXING MACHINES FOR THE PRODUCTION OF ALIMENTARY PASTES
Filed Jan. 14, 1931
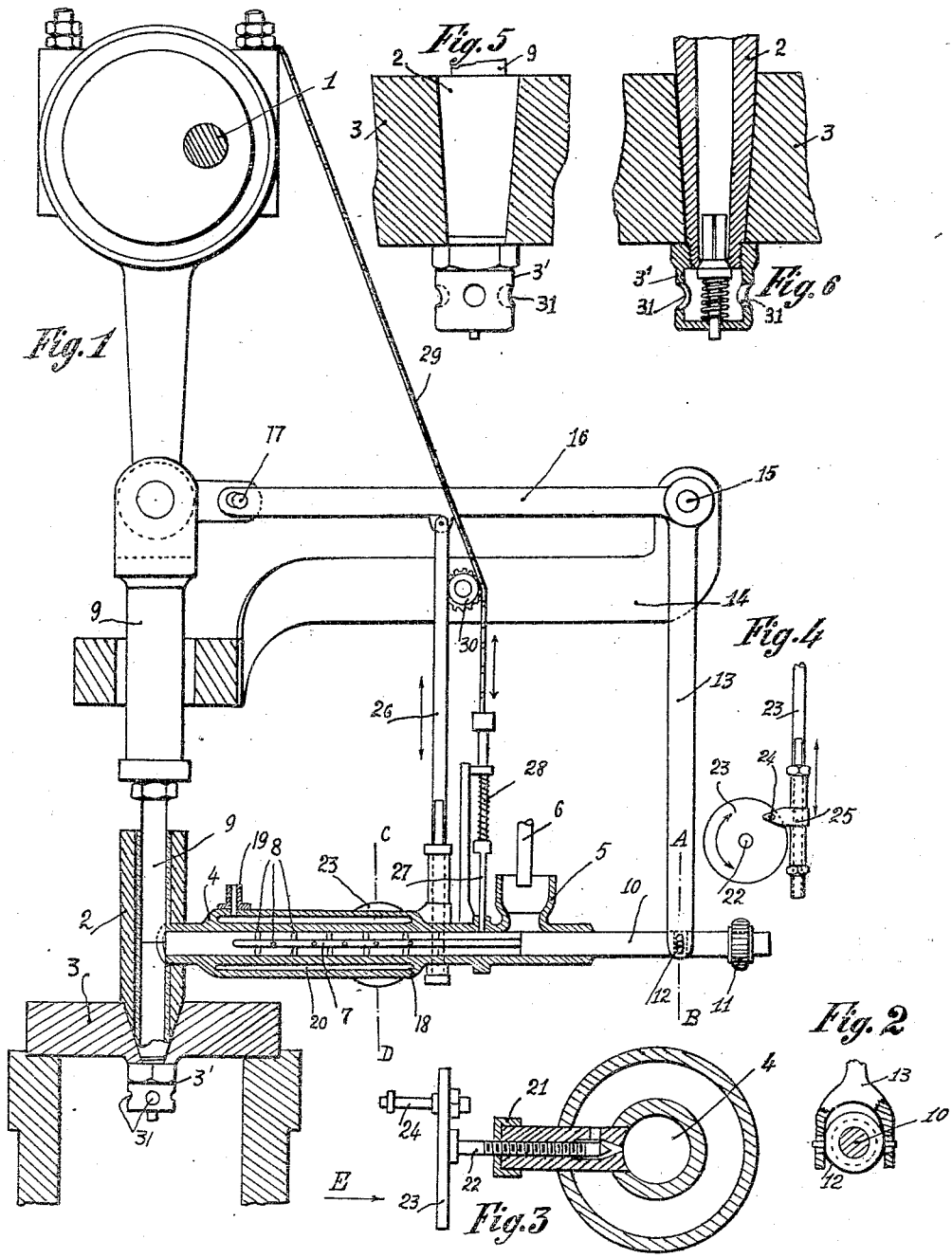
ROBERT KÖLLIKER
INVENTOR
BY Haseltine, Lake & Co
ATTORNEYS Patented Mar. 22, 1932

1,850,723

UNITED STATES PATENT OFFICE

ROBERT KÖLLIKER, OF KOLLBRUNN, SWITZERLAND

MIXING MACHINE FOR THE PRODUCTION OF ALIMENTARY PASTES

Application filed January 14, 1931, Serial No. 508,663, and in Switzerland January 17, 1930.

The object of the present invention is a mixing apparatus for machines for the production of alimentary pastes, in which alimentary material reduced to powder and water are taken together to a pressure piston and from this to a pressure chamber in which, in order to produce good mixing and kneading, there are provided perforated plates or similar members.

Practical experiments have shown that material reduced to powder and the water become intimately mixed only when the powdered material is dissolved and when sufficient time is allowed for the mixing; in the contrary case the water is again driven off from the powdered material before the mixture has been properly exposed to high pressure.

Now the present invention relates to a machine for the manufacture of alimentary pastes, with a simple device by means of which the mixing is carried out automatically and in the proper manner. Acccording to the invention the powdered material and the water are mixed in a chamber for preliminary mixing, and only after this operation is it conveyed to the pressure piston. The length of the chamber and the speed at which the mixture of powdered material and water is caused to pass into the chamber are regulated in such manner that the water and the powdered material become intimately mixed prior to the mixture being subjected to a high pressure. In order to accelerate the kneading of the water with the powdered material the preliminary mixing chamber may be heated and furthermore there may be provided in the chamber members which facilitate the kneading process of the water with the powdered material. The quantitative proportion of water and powdered material may be varied within wide limits. Heated water may also be used to advantage for the mixing process.

In the accompanying drawings there is shown diagrammatically one form of construction of the subject matter of the invention.

Figure 1 shows the preliminary mixing mechanism with the forward feed members in section.

Figure 2 is a section on line A—B of Figure 1;

Figure 3 is a section on line C—D of Figure 1;

Figure 4 is a view of some of the parts shown in Figure 3 in the direction E but on a smaller scale.

Figure 5 is an enlarged fragmentary view of the lower portion of the machine shown in Fig. 1 with one part in section.

Figure 6 is another view of the same in section.

Throughout the views, the same reference numerals indicate the same or corresponding parts.

At the end 3 of a machine for the manufacture of alimentary pastes there is attached a chamber 2 for the introduction of the material to be kneaded to which there is applied by means of a connection the mixing device comprising a central chamber 4 attached partly to the chamber 2 above mentioned and having at the rear a discharge outlet 5 to which a duct 6 conveys the powdered material from a container not shown in the drawings. In the chamber 4 there is pivotally mounted and displaceable axially a small shaft 7 provided with transverse journals 8 and fastened to the rear end to the piston 10 which is rotatably mounted at the end of the chamber 4 and carries a chain wheel 11, with which the piston 10 can rotate, and with it the small shaft 7. Upon the piston 10 there is mounted a ring 12 provided with a bolt with which there engages the fork shaped end of a lever 13 attached to a bolt or pivot 15, of an arm 14 of the machine frame. The second arm 16 of the lever is attached by means of a bolt 17 to the shank of an eccentric 1 which actuates the piston 9 so that in the vertical movement of the pressure piston 9 the piston 10 moves with alternate stroke in the chamber 4. At the same time and in any position of the shaft 7 and of the piston 10 this latter is caused to rotate by means of a chain and the sprocket wheel 11. The chamber 4 is surrounded by a jacket 18. The cavity 20 communicates with the water conduit 19, which supplies warm water to a chamber 20. In this way the chamber 4 and the mixture contained therein are heated. From the chamber 20 by means of a valve 21 with a stem 22 the water is conveyed to the inside of the chamber 4 and its admission is effected periodically at each advance of the piston 10, that is to say, every time the powdered material has been introduced into the chamber 4 there is also injected a predetermined quantity of water into the chamber 4. For this purpose the stem 22 of the valve 21 is provided upon its outer end with a disc 23 having a bolt 24. With this latter there engages a rod 26, by means of a shank 25, and may be adjusted by means of a screw connected to the arm 16 of the lever 13. On varying the path traversed by the threaded portion of stem 22 to any desired position, the size of the aperture for the passage of the water, and consequently the quantity of water introduced can easily be varied. During the return throw of the short shaft 7 the powdered material will tend to be carried back by the mixing and kneading arms or bolts 8 of the short shaft. In order to prevent this there is provided a diaphragm 27 which engages in the chamber 4 and partially closes it, so that it may be able to keep back the powdered material. The diaphragm 27 is subjected to the action of a spring 28 and in opposition to this it may be raised by means of a chain 29 which is regulated by the eccentric which actuates the pressure piston 9 in suchwise that the diaphragm 27 penetrates into the chamber 4 every time the piston 10 is displaced towards the right, Figure 1, the chain being vertically guided by a sprocket 30.

The method of operation may be briefly explained in the following manner:

The pressure piston 9 moves vertically with an alternate motion and with it there moves up and down the short mixing shaft 7 by means of the bell crank lever 13, 16. In each position there occurs therefore a rotation both of the piston 10 and of the short shaft 7. When the piston 10 moves to the left (Figure 1), it takes powdered material from the container 5 and pushes it to the left under the diaphragm which is in raised position. When the piston 10 retruns to the initial position illustrated in Figure 1, the diaphragm 27 under the action of the spring 28 immediately descends into the chamber 4. The powdered material that has passed out cannot return again to the hopper 5. Whilst the piston 9 descends the rod 26 is pushed downwards. In this way the stem 22 of the valve is rotated. The warm water can then pass from the chamber 20 to the chamber 4. The mixture of powdered material and water in the chamber 4 is now slowly pushed towards the chamber 2. The pressure piston 9 collects the mixture and pushes it into the interior of the machine through apertures 31, 31 in a cap 3' within the machine chamber 3, where the paste issuing from the cap may be accumulated or further treated by means not shown and forming no part of the present invention.

What I claim and desire to secure by Letters Patent of the United States is:—

1. In a machine for producing alimentary pastes from a mixture of water and powdered material, mixing mechanism, including the combination, with a rotary and reciprocable feeding piston and a mixing chamber therefor provided with a hopper, of means on said piston for mixing and propelling materials through said chamber entering the same from said hopper, a pressure chamber communicating with said mixing chamber, means in said pressure chamber for compressing materials from said mixing chamber, means for operating said piston, and means for preventing return of materials through said mixing chamber toward said hopper during return strokes of said piston.

2. In a machine for producing alimentary pastes from a mixture of water and powdered material, mixing mechanism, including the combination, with a rotary and reciprocable feeding piston and a mixing chamber therefor provided with a hopper, of means on said piston including a plurality of arms for mixing and propelling materials through said chamber entering the same from said hopper, a pressure chamber communicating with said mixing chamber, means in said pressure chamber for compressing materials from said mixing chamber, means for operating said piston, and means for preventing return of materials through said mixing chamber toward said hopper during return strokes of said piston.

3. In a machine for producing alimentary pastes from a mixture of water and powdered material, mixing mechanism, including the combination, with a rotary and reciprocable feeding piston and a mixing chamber therefor provided with a hopper, of means for operating said piston whereby to mix and periodically propel material from said hopper forward through said chamber, means for preventing return of said material toward said hopper during return strokes of said piston, and means for heating said material during passage through the mixing chamber including a hot water jacket associated therewith.

4. In a machine for producing alimentary pastes from a mixture of water and powdered material, mixing mechanism, including the combination, with a rotary and reciprocable feeding piston and a mixing chamber therefor provided with a hopper, of means for operating said piston whereby to mix and periodically propel material from said hopper forward through said chamber, means for preventing return of said material toward said hopper during return strokes of said piston, and means for heating said material during passage through the mixing chamber and feeding water into the same to be mixed with the materials therein, including a water jacket associated with said mixing chamber and communicating with the interior thereof.

5. In a machine for producing alimentary pastes from a mixture of water and powdered material, mixing mechanism, including the combination, with a rotary and reciprocable feeding piston and a mixing chamber therefor provided with a hopper, of a pressure chamber communicating with said mixing chamber, a pressure piston arranged in said pressure chamber for compressing and ejecting mixture entering from said mixing chamber, means for operating said feeding piston, means for introducing water into said mixing chamber intermediate said hopper and said pressure chamber, means for preventing return of material through said mixing chamber toward said hopper, and means for reciprocating said pressure piston in said pressure chamber.

6. In a machine for producing alimentary pastes from a mixture of water and powdered material, mixing mechanism, including the combination, with a rotary and reciprocable feeding piston and a mixing chamber therefor provided with a hopper, of a pressure chamber communicating with said mixing chamber, a pressure piston arranged in said pressure chamber for compressing and ejecting mixture entering from said mixing chamber, water supply means for introducing water into said mixing chamber intermediate said hopper and said pressure chamber, a movable member arranged intermediate said water supply means and said hopper for preventing return of materials through said mixing chamber toward the hopper during return strokes of said feeding piston, and means for operating both said pistons and said movable member.

7. In a machine for producing alimentary pastes from a mixture of water and powdered material, mixing mechanism, including the combination, with a rotary and reciprocable feeding piston and a mixing chamber therefor provided with a hopper, of a pressure chamber communicating with said mixing chamber, a pressure piston arranged in said pressure chamber for compressing and ejecting mixture entering from said mixing chamber, water supply means for introducing water into said mixing chamber intermediate said hopper and said pressure chamber, including a valve, a movable diaphragm associated with said mixing chamber intermediate said hopper and said water supply means for preventing return of materials through the mixing chamber toward the hopper during return strokes of said feeding piston, and means for operating both of said pistons and said diaphragm and also said water supply valve.

8. In a machine for producing alimentary pastes from a mixture of water and powdered material, mixing mechanism, including the combination, with a rotary and reciprocable feeding piston and a mixing chamber therefor provided with a hopper, of a pressure chamber communicating with said mixing chamber, a pressure piston arranged in said pressure chamber for compressing and ejecting mixture entering from said mixing chamber, water supply means for introducing water into said mixing chamber intermediate said hopper and said pressure chamber, including a valve, a movable diaphragm associated with said mixing chamber intermediate said hopper and said water supply means for preventing return of materials through the mixing chamber toward the hopper during return strokes of said feeding piston, and means for operating both of said pistons and said diaphragm and also said water supply valve, including an eccentric having a yoke, a two-armed lever connected by one arm to said eccentric yoke and to one of said pistons and by the other arm to the other piston, a rockable link connected to said yoke and to said valve and means connecting said yoke and said diaphragm.

ROBERT KÖLLIKER.